United States Patent
Negri Samper

(10) Patent No.: US 9,770,046 B2
(45) Date of Patent: Sep. 26, 2017

(54) TUBE REMOVING MACHINE AND METHOD FOR THE FABRICATION OF ARTIFICIAL CASINGS USING SAID MACHINE

(71) Applicant: VISCOFAN, S.A., Tajonar(Navarra) (ES)

(72) Inventor: Juan Negri Samper, Tajonar (ES)

(73) Assignee: Viscofa, S.A., Tajonar (Navarra) (ES)

( * ) Notice: Subject to any disclaimer, the term of this patent is extended or adjusted under 35 U.S.C. 154(b) by 0 days.

(21) Appl. No.: 15/324,071

(22) PCT Filed: Jul. 7, 2014

(86) PCT No.: PCT/ES2014/070553
§ 371 (c)(1),
(2) Date: Jan. 5, 2017

(87) PCT Pub. No.: WO2016/005613
PCT Pub. Date: Jan. 14, 2016

(65) Prior Publication Data
US 2017/0156382 A1 Jun. 8, 2017

(51) Int. Cl.
*A23L 13/00* (2016.01)
*A22C 13/00* (2006.01)

(52) U.S. Cl.
CPC .......... *A23L 13/00* (2016.08); *A22C 13/0006* (2013.01); *A22C 2013/0096* (2013.01)

(58) Field of Classification Search
CPC ................. A23L 13/00; A22C 13/0006; A22C 2013/0096
See application file for complete search history.

(56) References Cited

U.S. PATENT DOCUMENTS

| | | |
|---|---|---|
| 3,247,037 A | 4/1966 | Shiner et al. |
| 3,562,368 A | 2/1971 | Bridgeford |
| 3,669,791 A | 6/1972 | Bridgeford |
| 3,799,823 A | 3/1974 | Talty et al. |
| 3,917,862 A | 11/1975 | Bridgeford |
| 5,916,644 A | 6/1999 | Stanton et al. |
| 6,004,488 A | 12/1999 | Farias |

*Primary Examiner* — Michael C Miggins
(74) *Attorney, Agent, or Firm* — McNees Wallace & Nurick LLC

(57) ABSTRACT

The present invention relates to a tube-removing machine and method of manufacturing artificial casings by means of said machine, allowing a fast, efficient and automatic cutting of the sections of casing (2) which contain tubes (5), subsequently splicing the remaining casing (2) once said tube (5) is discarded, comprising detection means (10) for detecting the arrival of a tube (5) contained in the casing (2); cutting means (20) for cutting a section of the casing (2) incorporating said tube (5); splicing means (30) for splicing the ends of the cut casing (2); and temporary storage means (40) for storing the casing (2) which allow continually taking in casing (2) in the tube-removing machine (1) during the time used in the cutting and splicing phases, preventing interruptions in the subsequent shirring process.

11 Claims, 2 Drawing Sheets

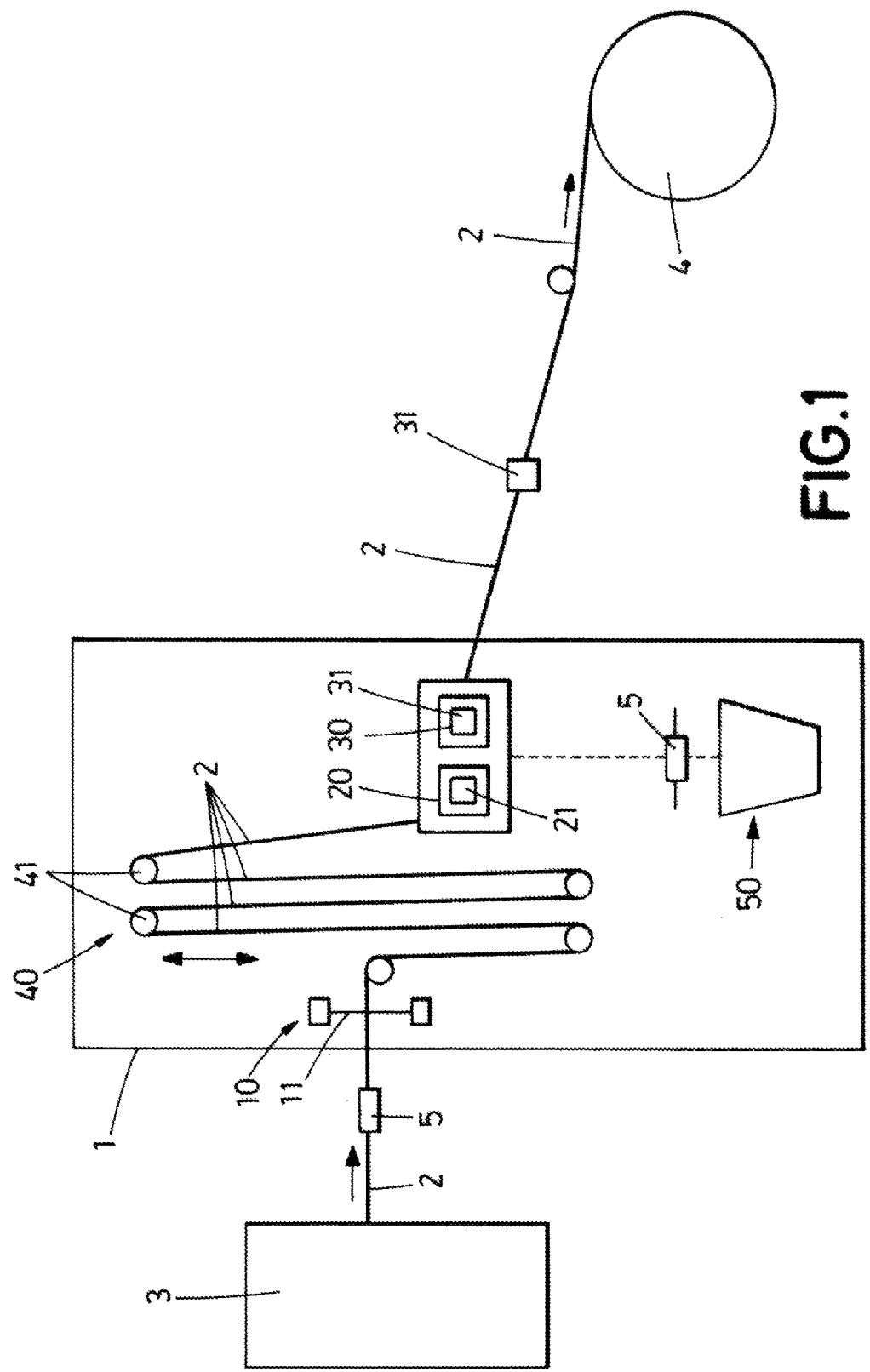

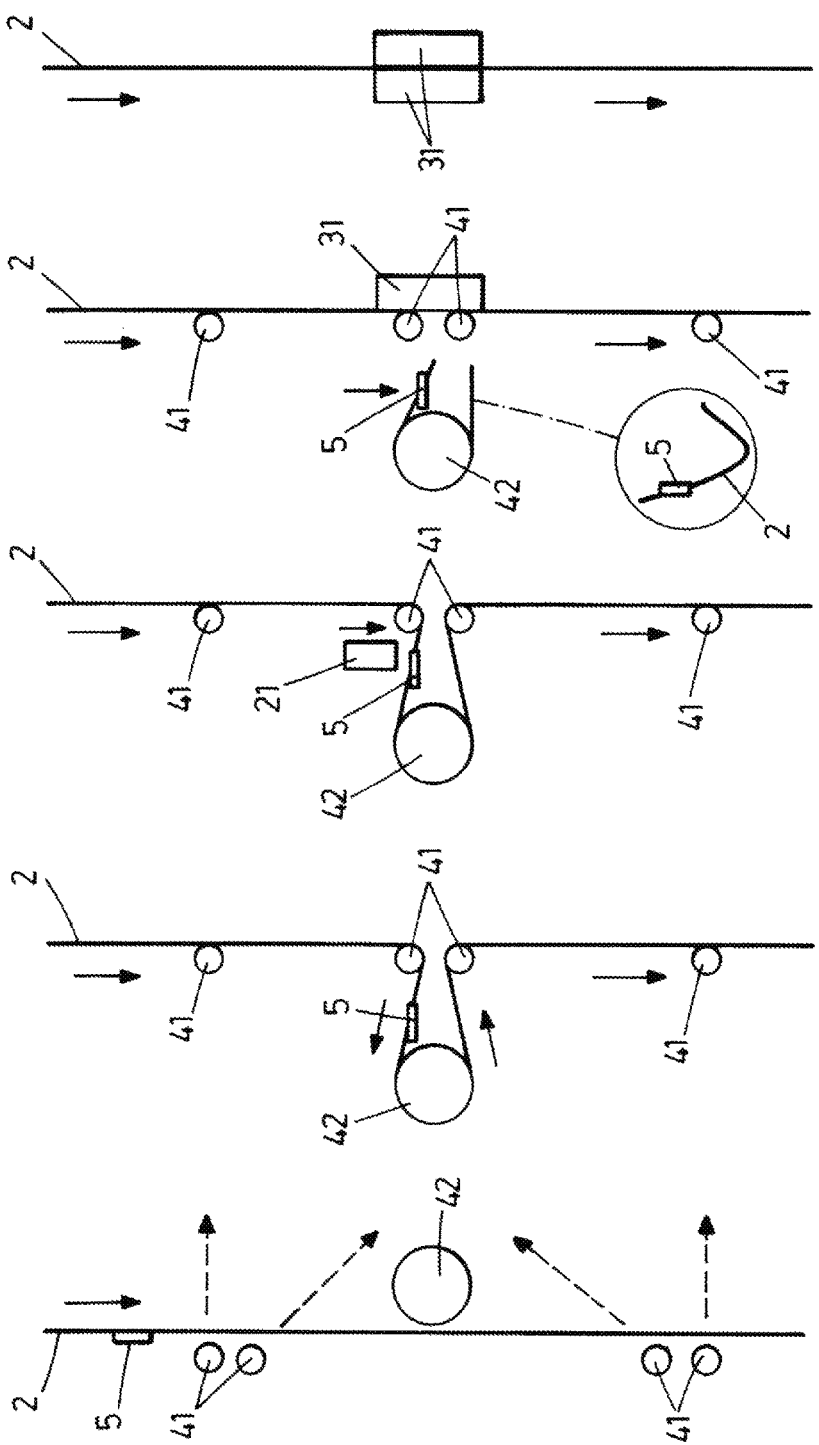

TUBE REMOVING MACHINE AND METHOD FOR THE FABRICATION OF ARTIFICIAL CASINGS USING SAID MACHINE

OBJECT OF THE INVENTION

The present invention belongs to the food sector, and more specifically to manufacturing artificial casings for filled food products and/or meat products.

The main object of the present invention is a tube-removing machine for production lines that produce artificial casings, which allows a fast and automatic cutting of those sections of casing which contain tubes, subsequently splicing same, thereby favoring the continuous and uninterrupted winding of the casing on a winding reel, which prevents stops in the shirring machine and therefore optimizing the total production line output.

BACKGROUND OF THE INVENTION

The manual insertion of tubes arranged inside the casings is known today in production and manufacturing lines for producing artificial casings to favor the removal and ventilation of fluids present inside them during their passage through the drying phase (dryer). However, in subsequent phases of the production line, said tubes entail some drawbacks, among which the following stand out:

If the casing is wound on a reel without previously removing the tubes, lumps are formed inside the reel on which successive layers of casing are tightened. This causes deformations of the contacting layers, which often requires discarding them to prevent anomalous behavior of the casing during its subsequent shirring or filling phase. As it is a point of interruption of the process, it can be a weak point where the casing breaks.

The reel of smooth casing can have several tubes therein from the cyclical cuts for draining, or from additional cuts made manually, for example if an additional removal of trapped liquids/gases is necessary, or to restore the continuity of a break of the casing in the process, or to inflate the trapped air pocket in the dryer as it gradually loses air pressure. Some examples of the use of these tubes in artificial casings can be found in the following documents: U.S. Pat. No. 3,247,037 ("Puncture seal"); U.S. Pat. No. 3,799,823 ("Method for splicing collagen casing"); U.S. Pat. No. 3,917,862 ("Method for patching edible artificial collagen sausage casings"); U.S. Pat. No. 6,004,488 ("Continuous process for the manufacture of tubular food casings").

Although the tubes can be discarded on the reel, for example by starting a new reel every time a tube arrives, this manner of proceeding is rather inefficient, slow and tedious, generating "downtimes".

The tube can be a bother in the subsequent processing of the smooth casing: For example, if the smooth casing is subjected to a printing process, for which purpose it goes between high speed printing rollers, when the tube arrives it hits against the rollers and the casing breaks as a consequence, the tube gets stuck, and the printing system must be threaded up again and re-launched, the rollers cleaned, etc. Likewise, if the smooth casing is subjected to a shirring process, the smooth casing can be fed by pulling between pressed rollers at a high speed. When the tube arrives it also hits against the rollers and the casing breaks as a consequence, the tube gets stuck, and the shirring system must be threaded up again and re-launched, etc.

If the tube successfully passes between the rollers, the smooth casing is threaded on a spindle. The tube can hit against the spindle and the shirring stops. This has the drawback of having to remove the tube and threading up the entire system again.

The half-finished shirred stick must be removed, thereby wasting valuable material which represents a considerable loss when multiplied by the large amount of sticks obtained daily.

One possible way of avoiding the aforementioned situation is for the operator himself/herself to manually cut the tube once he/she visually detects its arrival, discarding the piece of casing which contains said tube, and subsequently winding the casing on the reel again. The main problem with acting in this manner is that the winding reel sustains interruptions which accordingly cause the subsequent shirring process to be stopped. Furthermore, the considerable drawback involved in having to have an operator who is at all times aware and attentive with respect to this phase of the production line after the exit of the casing from the dryer with the tubes included must be pointed out, with the possible human errors or faults that may occur, being a task which requires concentration, constant attention and time, not to mention the stress that this generates for the operator.

Therefore, the presence of tubes after the drying phase entails deformations on the winding reel, which leads to interruptions in the shirring machine, and accordingly to a substantial loss in production line productivity, where machine stops and "downtimes" translate into very significant economic losses.

DESCRIPTION OF THE INVENTION

The aforementioned drawbacks are solved by means of the present invention, providing a tube-removing machine which fundamentally stands out because it allows a fast, efficient and automatic cutting of the sections of casing which contain tubes therein, discarding said tubes to then splice the ends of the cut casing such that continuous winding of the casing on a reel without any interruption is favored, which allows preventing stops in the subsequent shirring machine which, as a result of the incorporation of the tube-removing machine herein described, can work at maximum speed and hence optimize the production line output. It must also be mentioned that all this is performed automatically without the need for human intervention, thereby eliminating human errors.

More particularly, the tube-removing machine object of invention is particularly located between a drying machine for drying artificial casings and a winding reel for winding same, said tube-removing machine comprising at least: detection means for detecting the arrival of a tube contained in a casing; cutting means for cutting a section of the casing incorporating said tube; splicing means for splicing the ends of the cut casing, suitable for applying at least one splicing adhesive that joins said ends of the casing; and temporary storage means for storing the casing, which allow continuously taking in casing in the tube-removing machine without interruptions during the time in which the section of the casing which contains the tube is being cut and the subsequent splicing of the casing.

Although the location of the tube-removing machine is described in the preceding paragraph as between the drying machine and the winding reel, it has nevertheless been envisaged that said tube-removing machine can also be applied for an off-line operation, i.e., installed after a reel which unwinds the artificial casing which contains the tubes, said casing entering the tube-removing machine, and after the cutting and splicing, being wound again on another reel that now no longer has tubes. On the other hand, the tube-removing machine object of invention can likewise work in the shirring operation, i.e., be located in the shirring machine itself, such that the tubes are directly removed while shirring is performed in the step between unwinding smooth casing from the reel and before it is taken in by the spindle of the shirring machine.

The detection means preferably comprise at least one photocell, whereby it is possible to efficiently and precisely detect the arrival or presence of a tube inside the casing. In turn, the cutting means preferably comprise at least one clamp suitable for holding the casing and correctly and completely cutting the section of casing which contains the tube with a cutter. With respect to the aforementioned temporary storage means for storing casing, they preferably comprise moving rollers whereby the casing circulates and which are suitable for creating a stock of casing over the course of time in which the section of the casing which contains the tube is being cut and the subsequent splicing of the casing, which allows keeping the tension of the casing constant at all times until its arrival at the winding reel.

It has further been envisaged that the tube-removing machine of the present invention can comprise approaching or approximating means for bringing the section of casing to be cut towards the cutting means and which preferably comprise extracting rollers and a main roller.

It has also been envisaged that the machine additionally comprises collection means for collecting the cut section of the casing which contains the tube. Said collection means can consist of, for example, a bucket or tray located below the cutting means and onto which the cut section of the casing which contains the tube falls due to gravity.

According to another object of the invention, the method of manufacturing artificial casings using the tube-removing machine described above is described below, said method basically comprising the phases of:
the artificial casing entering the tube-removing machine,
detecting the arrival of a tube inside the casing,
cutting the section of the casing which contains said tube,
splicing the ends of the casing with at least one adhesive once said section of the casing which contains the tube is cut and discarded,
creating a buffer or stock of casing parallel to the aforementioned cutting and splicing, such that the tube-removing machine at all times continues to allow the entrance of casing while the process of removing the tube is being performed.
once the section of casing is cut and the ends created by cutting the casing are spliced with at least one adhesive, the winder pulls on the spliced casing consuming the stock of casing created.

Therefore, the tube-removing machine would be ready and prepared to start a new detection, cutting and splicing cycle. At this point it should be indicated that it has been envisaged for the machine herein described to be able to be moved by means of a carriage or the like, such that said carriage moves the machine in a precise and controlled manner to that line "x" of the manufacturing process where the signal indicating the presence of a tube in the casing is detected or activated.

It should be mentioned that in the tube-removing machine of the present invention, the casing with the adhesive already incorporated has perfectly aligned edges, which allows air to circulate therethrough during the subsequent shirring operation, and it allows the casing to be able to pass through the spindle of the shirring machine uninterrupted. It must finally be indicated that it has been envisaged that the tube-removing machine object of invention is suitable for any type of artificial casings, whether they are cellulose, collagen or plastic casings.

DESCRIPTION OF THE DRAWINGS

To complement the description that is being made and for the purpose of helping to better understand the features of the invention according to a preferred practical embodiment thereof, a set of drawings is attached as an integral part of said description in which the following has been depicted with an illustrative and non-limiting character:

FIG. 1 shows a schematic view of the tube-removing machine of the invention, incorporated in a production line for producing artificial casings.

FIGS. 2A, 2B, 2C, 2D, 2E show respective sequential views of the steps performed by the tube-removing machine after detecting a section of casing which contains a tube.

PREFERRED EMBODIMENT OF THE INVENTION

A preferred embodiment is described below in reference to the aforementioned figures without this limiting or reducing the scope of protection of the present invention.

FIG. 1 shows a basic diagram of a production line for producing artificial casings (2) in which the tube-removing machine (1) of the invention is incorporated, which machine is located in the present example between the drying machine (3) for drying casings (2) and the winding reel (4) for winding same. More specifically, according to the present example, the tube-removing machine (1) comprises:
detection means (10) for detecting the arrival of a tube (5) contained in a casing (2), and comprising a photocell (11),
approaching or approximating means (50) for bringing the section of casing (2) to be cut towards the cutting means, and comprising extracting rollers (51) and a main roller (52) depicted in FIGS. 2A-2D,
cutting means (20) for cutting the section of the casing (2) incorporating said tube (5), comprising in the present embodiment a clamp (21), shown in FIG. 2C, suitable for holding the casing and a cutter capable of correctly and completely cutting the section of the casing (2) incorporating said tube (5),
splicing means (30) for splicing the ends of the cut casing (2) and which are suitable for applying splicing adhesives (31), depicted in FIGS. 2D and 2E, that join said ends of the casing (2),
temporary storage means (40) for storing the casing (2), comprising moving rollers (41) depicted in FIG. 1, whereby the casing (2) circulates and which allow creating a buffer or stock of casing for continually taking in casing (2) in the tube-removing machine (1) during the time in which the section of the casing (2) which contains the tube (5) is cut and spliced, and
collection means (60), shown in FIG. 1, for collecting the cut and discarded section of the casing (2) which contains the tube (5) and which in the present embodiment comprise a tray located below the cutting means (20), and onto which the cut section of the casing (2) which contains the tube (5) falls by its own weight due to the action of the force of gravity.

Therefore, one way of carrying out the entire process would be as follows: after detecting a tube (5) in a section of the casing (2), the casing is stopped according to FIG. 2 to perform the cutting and splicing process. At this point the winder (4) is also stopped and taut while said cutting and splicing is performed.

Nevertheless, the casing (2) continues to come out towards the tube-removing machine (1) from the drying machine (3). The rollers (41) of FIG. 1 start to travel upwards to absorb said casing (2) that continues to come out, such that they create a length of casing between said rollers (41), achieving that the casing (2) coming out of the dryer (3) does not stop.

Once the cutting and splicing process of FIG. 2 has ended, the casing is allowed to progress again, i.e., it starts moving again. To that end the winder (4) again pulls on the already spliced casing (2). The moving rollers (41) of FIG. 1 slowly move downwards again to their initial position while the winder (4) slowly consumes the stock of casing (2), the entire system returning to the initial situation, the machine being ready to receive, cut and splice a new section of the casing (2) with a tube (5).

Finally, the advantages obtained by means of the tube-removing machine of the present invention should be mentioned, among which the following stand out:

- The tube is discarded efficiently, quickly and automatically after the casing passes through the dryer. The casing needs the tube in the dryer to restore continuity of the inflated tube, which had been lost when cutting the piece of casing that contained the cut. The casing is therefore dry and the adhesive can adhere to it with no difficulties.
- Printing impediments are prevented; the adhesive passes through the rollers without any setbacks or interruptions.
- Deformations on the winding reel are substantially reduced because the tube has been replaced with an adhesive.
- Shirring machine productivity after winding the casing on the winding reel is increased because shirring is not interrupted by cutting the tube from the casing.

The invention claimed is:

1. Tube-removing machine (1) for production lines that produce artificial casings (2), characterized in that it comprises at least:
   detection means (10) for detecting the arrival of a tube (5) contained in a casing (2),
   cutting means (20) for cutting a section of the casing (2) incorporating said tube (5),
   splicing means (30) for splicing the ends of the cut casing (2) and which are suitable for applying at least one splicing adhesive (31) that joins said ends of the casing (2), and
   temporary storage means (40) for storing the casing (2) which allow continuously taking in casing (2) in the tube-removing machine (1) without interruptions during the time in which the section of the casing (2) which contains the tube (5) is being cut and the subsequent splicing of the casing (2).

2. Tube-removing machine (1) according to claim 1, characterized in that the detection means (10) comprise at least one photocell (11).

3. Tube-removing machine (1) according to claim 1, characterized in that the cutting means (20) comprise at least one clamp (21).

4. Tube-removing machine (1) according to claim 1, characterized in that the cutting means (20) comprise a cutter.

5. Tube-removing machine (1) according to claim 1, characterized in that the temporary storage means (40) for storing the casing (2) comprise moving rollers (41) whereby the casing (2) circulates and which are suitable for creating a stock of casing (2) over the course of time in which the section of the casing (2) which contains the tube (5) is being cut and the subsequent splicing of the casing (2).

6. Tube-removing machine (1) according to claim 1, characterized in that it additionally comprises approaching or approximating means (50) for bringing the section of casing (2) to be cut towards the cutting means.

7. Tube-removing machine (1) according to claim 6, characterized in that the approaching or approximating means (50) comprise extracting rollers (51) and a main roller (52).

8. Tube-removing machine (1) according to claim 1, characterized in that it additionally comprises collection means (60) for collecting the cut section of the casing (2) which contains the tube (5).

9. Tube-removing machine (1) according to claim 8, characterized in that the collection means (60) comprise a tray located below the cutting means (20) and onto which the cut section of the casing (2) which contains the tube (5) falls due to gravity.

10. Method of manufacturing artificial casings using the tube-removing machine (1) described in claim 1, characterized in that it comprises the phases of:
   the artificial casing (2) entering the tube-removing machine (1),
   detecting the arrival of a tube (5) inside the casing (2),
   cutting the section of the casing (2) which contains said tube (5),
   splicing the ends of the casing (2) with at least one adhesive (31) once said section of the casing (2) which contains the tube (5) is cut and discarded,
   creating a buffer or stock of casing (2) parallel to the aforementioned cutting and splicing, such that the tube-removing machine (1) at all times continues to allow the entrance of casing (2) while the process of removing the tube is being performed,
   once the section of casing (2) is cut and the ends created by cutting the casing (2) are spliced with at least one adhesive (31), the winder (4) pulls on the spliced casing (2) consuming the stock of casing (2) created.

11. Method of manufacture according to claim 10, characterized in that cutting is performed by means of approaching the section of the casing (2) to be cut which contains the tube (5) through the approaching or approximating means (50) for bringing the section of casing towards the cutting means (20).

* * * * *